United States Patent [19]

Yater

[11] Patent Number: 4,458,794
[45] Date of Patent: Jul. 10, 1984

[54] DRIVE SYSTEM WITH OIL SHEAR CLUTCH-BRAKE UNIT

[75] Inventor: Jerry L. Yater, Hamilton, Ohio

[73] Assignee: Force Control Industries, Fairfield, Ohio

[21] Appl. No.: 378,507

[22] Filed: May 17, 1982

[51] Int. Cl.³ .................... B60K 41/24; F16H 37/06
[52] U.S. Cl. ................... 192/18 A; 192/0.098; 74/661
[58] Field of Search .............. 192/18 A, 0.098, 18 R, 192/18 B, 70.12, 113 B, 12 C, 87.18, 87.19; 74/661, 665 E, 665 GE, 665 G; 474/112

[56] References Cited

U.S. PATENT DOCUMENTS

| | | | |
|---|---|---|---|
| 2,691,553 | 10/1954 | Pettigrew | 474/112 |
| 2,771,790 | 11/1956 | Munschauer | 192/0.098 |
| 3,127,790 | 4/1964 | Howey | 74/661 |
| 3,638,773 | 2/1972 | Lewis et al. | 192/18 A |
| 3,830,349 | 8/1974 | Williams | 74/661 |
| 3,924,715 | 12/1975 | Cory | 192/18 A |
| 4,078,639 | 3/1978 | Beneke | 192/18 A |
| 4,113,067 | 9/1978 | Coons et al. | 192/113 B |
| 4,125,178 | 11/1978 | Monks | 192/12 C |

Primary Examiner—George H. Krizmanich
Assistant Examiner—M. Manley
Attorney, Agent, or Firm—Jacox & Meckstroth

[57] ABSTRACT

A first input shaft and an output shaft are supported in axial alignment by a housing which contains oil and also supports an annular second input shaft coaxial with the output shaft. The input shafts may be selectively coupled to the output shaft by compressing corresponding clutch sets of interfitting annular plates and discs, and the output shaft may be quickly stopped by compressing a brake set of interfitting annular plates and discs. The brake set is disposed between the two clutch sets, and a pair of non-rotating fluid actuated pistons are arranged between the corresponding clutch sets and the brake set. The output shaft has fluid impeller hub portions for recirculating oil outwardly between the sets of plates and discs and the input shafts are driven by corresponding electric motors or by a single double-ended electric motor.

17 Claims, 2 Drawing Figures

DRIVE SYSTEM WITH OIL SHEAR CLUTCH-BRAKE UNIT

BACKGROUND OF THE INVENTION

In the operation of various types of machinery or equipment, it is frequently necessary to provide a drive system having an output shaft which is capable of being quickly started and stopped, or quickly reversed or driven in the same direction at a different speed. For some machinery, a drive system including an electrically actuated clutch and brake unit is adequate, especially when the horsepower requirements are relatively low. However, with other machinery requiring relatively higher horsepower drive systems, it has been found desirable to use one or more oil shear clutch-brake units of the general type, for example, as disclosed in U.S. Pat. No. 3,638,773 and No. 3,924,715 which issued to the assignee of the present invention. The construction and operation of these clutch-brake units are described in the patents and provide for quickly starting and stopping an output shaft with respect to an axially aligned and continuously driven input shaft. Each unit has a series of interfitting clutch plates and discs and a series of interfitting brake plates and discs. Oil is recirculated within the housing between the plates and discs to provide for cooling and lubricating the plates and discs and thereby significantly extending the useful service life of the clutch-brake unit.

SUMMARY OF THE INVENTION

The present invention is directed to an improved drive system which incorporates a novel clutch-brake unit and provides for quickly starting and stopping an output shaft as well as quickly reversing the output shaft and/or driving the output shaft at a different speed. The drive system of the invention is also adapted to provide an output of substantial horsepower and is dependable in operation to assure an extended operational life without down time for servicing. The drive system of the invention incorporates two clutches and a brake and assures that neither of the clutches can be engaged simultaneously with engagement of the brake or that the clutches can be simultaneously engaged, thereby cooperating to provide for an extended dependable operation.

In accordance with the invention, the above features and advantages are provided by a clutch-brake unit having a housing which supports a first input shaft and an elongated output shaft in axial alignment. The housing also supports an annular second input shaft which surrounds the output shaft in concentric relation, and each input shaft may be coupled to the output shaft through a corresponding annular clutch including a series of interfitting annular clutch plates and discs. The output shaft may also be quickly stopped by actuation of an annular brake located between the two clutches and including a series of interfitting annular brake plates and discs. The housing includes annular sections which form a pair of fluid cylinders for receiving non-rotating annular pistons located between the brake and the corresponding clutches.

Each of the pistons is movable between a clutch engaging position and a brake engaging position, and the output shaft is braked only when both of the clutches are in their brake engaging positions. The input shafts may be driven by separate electric motors, or both input shafts may be driven by a single electric motor having a double-ended shaft connected to the input shafts by endless belts or chains. The actuation of the pistons is also controlled by a valve system which assures that both of the clutches cannot be engaged simultaneously.

Other features and advantages of the invention will be apparent from the following description, the accompanying drawing and the appended claims.

DESCRIPTION OF THE PREFERRED EMBODIMENTS

Figure 1:
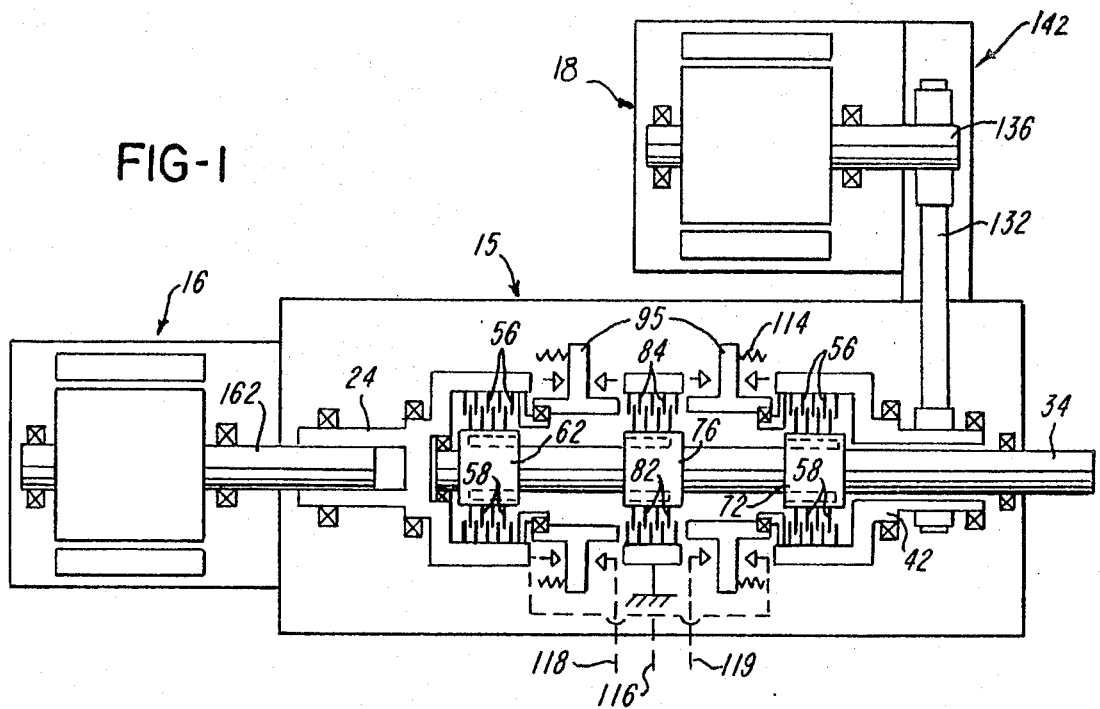
FIG. 1 is a diagrammatic view of a reversing drive system constructed in accordance with the invention.

The drive system illustrated diagrammatically in FIG. 1 includes a clutch-brake unit 15, a first electric drive motor 16 and a second electric drive motor 18. The motors 16 and 18 may be identical or may have different ratings of horsepower and/or speed. The specific construction of the clutch-brake unit 15 is disclosed in reference to FIG. 2, and the unit has some components which are generally similar to the components of the clutch-brake units disclosed in above-mentioned U.S. Pat. Nos. 3,638,773 and 3,924,715.

The clutch-brake unit 15 includes a housing 29 having one end section 22 which supports a tubular or annular input shaft 24 by a set of anti-friction bearings 26 and 27. The housing 20 has an opposite end section 32 which rotatably supports one end portion of an elongated output shaft 34 by an anti-friction bearing 36. The opposite end portion of the output shaft 34 is supported by an anti-friction bearing 37 retained within an annular portion 38 of the input shaft 24 so that the input shaft and the output shaft are axially aligned. The housing 20 also rotatably supports another or second annular input shaft 42 which surrounds or is concentric with the output shaft 34 and is retained by a set of anti-friction bearings 43 and 44. The housing section 22 has a end surface 47 for receiving an adaptor 48 which provides for mounting a conventional electric drive motor 16 having a standard "C" face mounting. The adaptor 48 is secured to the housing section 22 by a set of angularly spaced screws 51.

The first input shaft 24 includes a set of axially projecting and circumferentially spaced lugs 53 which support a set or series of annular clutch plates 56 for rotation with the input shaft 24. In a manner as described in the above-mentioned patents, the clutch plates 56 are arranged in interfitting relation with a set or series of clutch discs 58 mounted on a splined annular hub portion 62 of the output shaft 34. The annular hub portion 62 has peripherally spaced vanes 63 and openings or slots 64 to form an impeller which recirculates oil outwardly between the interfitting clutch plates and discs.

The second annular input shaft 42 also has a set of peripherally spaced and axially projecting lugs 67 which support another set or series of clutch plates 56. The plates 56 also interfit with another set or series of clutch discs 58 mounted on another splined annular hub portion 72 of the output shaft 34. The hub portion 72 also has angularly spaced vanes 73 and openings or slots 74 to form another oil recirculating impeller within the series of interfitting clutch plates 56 and discs 58.

The output shaft 34 also includes another or third annular hub portion 76 having angularly spaced vanes 77 and outlet slots 78 to form a third oil recirculating impeller within a series of annular brake discs 82 connected to the splined outer surface of the hub portion 76. The brake discs 82 are arranged in interfitting relation with a set or series of annular brake plates 84 supported by angularly spaced lugs 86 projecting axially from an annular section 88 of the housing 20. Thus the brake plates 84 are permitted to shift axially on the lugs 86 but are prevented from rotating by the lugs 86 forming part of the housing section 88.

The housing 20 also includes an annular section 92 having a cylindrical bore 93 which cooperates with the housing section 88 to form a cylinder for receiving a non-rotating annular actuating piston 95. The piston 95 includes arcuate portions 97 which support a brake pressure ring 98 positioned on one side of the set of interfitting brake discs 82 and plates 84. The annular piston 95 also carries an anti-friction bearing 102 which supports a rotatable pressure ring 104 connected to the lugs 67 for rotation with the input shaft 42 adjacent the set of interfitting clutch plates 56 and discs 58.

The housing 20 further includes an annular spacer section 106 which abuts an annular housing section 108. Another annular housing section 110 has a cylindrical bore 111 and cooperates with the housing section 108 to define another fluid cylinder for receiving another non-rotating annular piston 95. The second piston 95 also supports a rotatable clutch pressure ring 104 through a bearing 102, and the clutch ring 104 receives the lugs 53 so that the ring 104 rotates with the input shaft 24. As mentioned above, the second annular piston 95 also includes a brake pressure ring 98 which is positioned on the opposite side of the set of interfitting brake plates and discs.

Figure 2:
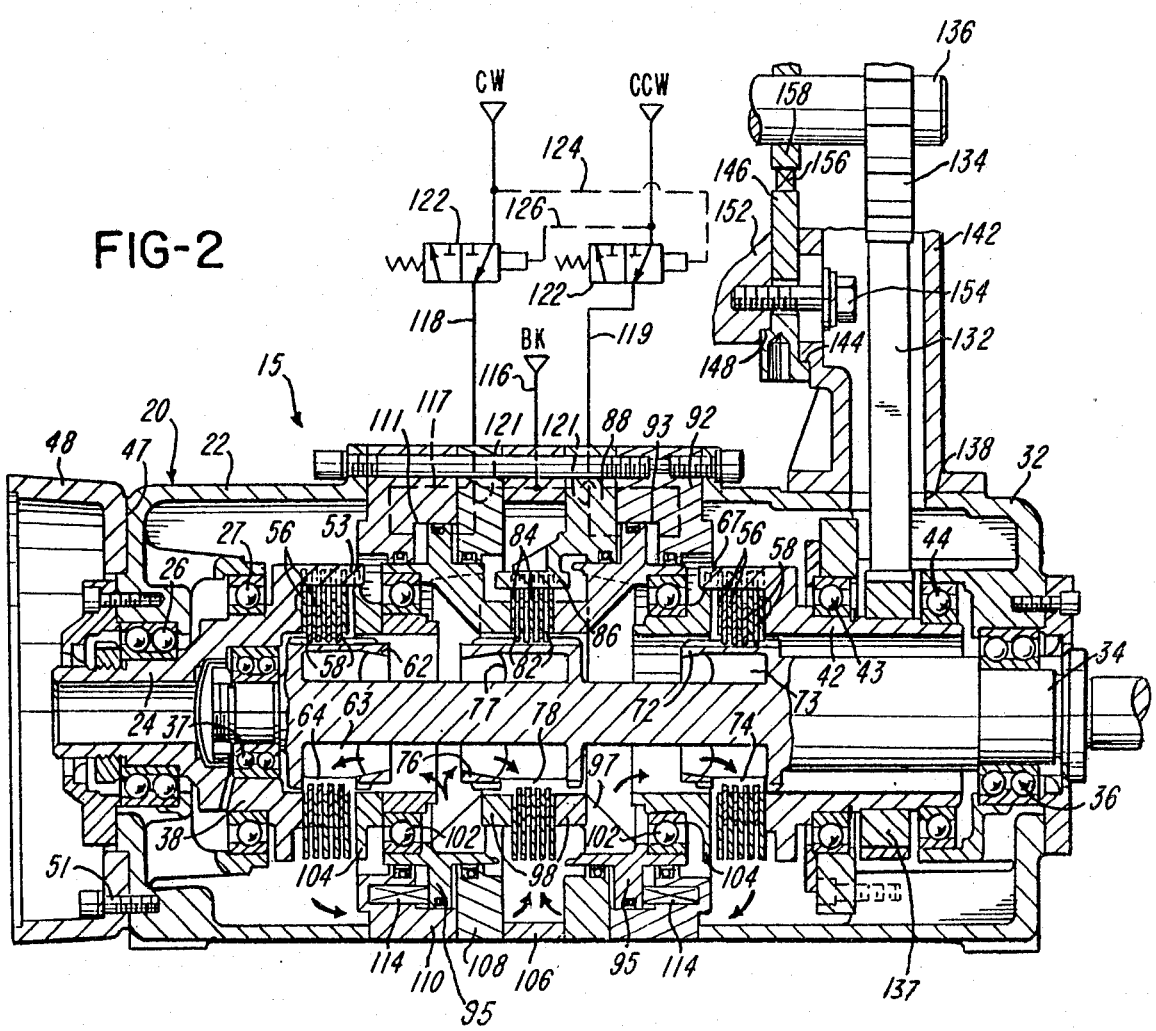
FIG. 2 is an enlarged axial section of a clutch-brake unit which is incorporated in the drive system shown in FIG. 1.

As shown diagrammatically in FIG. 1 and more specifically in FIG. 2, the annular pistons 95 are normally urged towards each other or their respective brake engaging positions by a series of angularly spaced compression springs 114 retained within axially extending holes formed within the housing sections 92 and 110. This normal braking acting provides for "fail-safe" braking of the output shaft 34 in the event that the supply of actuating fluid or air fails. However, additional actuation of the pistons 95 to their respective brake engaging positions is produced by supplying pressurized air through a line 116 and a passage 117 within the housing sections. The air is directed to the outer surfaces of the pistons 95 so that the pistons are moved together causing the pressure rings 98 to clamp the rotating brake discs 82 to the interfitting non-rotating brake plates 84, thereby braking the output shaft 34.

Selective actuation of the two clutches for coupling either of the input shafts 24 or 42 to the output shaft 34, is produced by selectively pressurizing either of the pistons 95 in an outward direction by supplying pressurized air through a corresponding air line 118 or 119 and corresponding passage 121 within the housing section 88 or 108. Pressurized air is selectively supplied to either of the lines 118 or 119 through a corresponding pilot operated valve 122, and the valves 122 are connected to pilot air lines 124 and 126 to assure that one valve is closed when the other is open.

The second annular input shaft 42 is driven through an endless silent chain drive 132 which includes a sprocket 134 mounted on the shaft 136 of the electric motor 18 and a sprocket 137 mounted on the input shaft 42. The chain drive 132 extends through a slot 138 within the housing end section 32 and is enclosed within a chain drive housing 142 secured to the top of a housing section 32. The chain drive housing 142 has a cylindrical surface 144 which is eccentric to the axis of the motor shaft 136 and supports an annular mounting plate 146 which may be rotated relative to the chain drive housing 142. The annular plate 146 has a cylindrical surface 148 and mates with a standard "C" mounting face on an end bearing bracket 152 of the motor 18. The assembly of the chain drive housing 142, adjustment plate 146 and the motor bracket 152 is secured together by a set of angularly spaced screws 154, and an oil sealing ring 156 is retained by the adjustment plate 146 to engage a ring 158 mounted on the motor shaft 136 for confining lubricating oil within the chain drive housing 142.

The first input shaft 24 is splined or keyed to the shaft 162 of the electric motor 16 to form a direct drive coupling between the motor 16 and the input shaft 24. However, it is also within the scope of the invention to eliminate the motor 16 and to replace the drive motor 18 with a motor having a double-ended shaft. The rearward projecting portion of the motor shaft would drive the input shaft 24 preferably through a cog belt drive having a ratio which would provide for selectively driving the output shaft 34 at two different speeds in the same direction. As mentioned above, the drive system illustrated in FIG. 1 is ideally suited to provide a reversing output shaft 34 which, for example, may be driven in a clockwise direction by the motor 16 and in a counter-clockwise direction by the motor 18.

In operation of the clutch-brake unit 15, when it is desired to drive the output shaft 34 in a clockwise direction, for example, by the motor 16, pressurized air is supplied through the line 118 which moves the left piston 95 towards the left in FIG. 2 to release the brake and apply the clutch which connects the input shaft 24 to the output shaft 34. If it is then desired to quickly stop the output shaft 34 and reverse its direction, the pressure is released in the line 118 and applied to the brake line 116 so that both pistons 95 are forced together to compress the brake plates and discs together to brake the output shaft 34 to the housing 20. The air pressure to the line 118 is released and applied to the line 119 so that the right piston 95 moves to the right in FIG. 2. This releases the brake and actuates the second clutch for coupling the continuously rotating input shaft 42 to the output shaft 34 to drive the output shaft in the opposite or counter-clockwise direction by the motor 18. The cycle is repeated for again reversing the rotation of the output shaft 34.

From the drawing and the above description, it is apparent that a drive system constructed in accordance with the present invention, provides desirable features and advantages. For example, the clutch-brake unit 15 is effective to minimize the inertia of the reversing output shaft 34 and the rotating discs, and this low inertia is highly desirable for obtaining a high speed reversing operation. In addition, it is apparent that neither of the clutches can overlap with the brake since the brake plates and discs can only be clamped together when both of the pistons 95 are moved to their respective brake engaging positions. Also, the pilot actuated valves 122 assure that both of the clutches cannot be simultaneously engaged since the valves assure that pressurized air can only be supplied to one of the lines 118 or 119 and not simultaneously to both of the lines.

It is also apparent that the brake applying springs 114 may be sufficiently heavy to apply the maximum desired braking pressure, or the springs 114 may be omitted with the braking pressure being applied solely by the fluid or air pressure within the line 116. The construction of the housing 20 with the annular sections 88, 92, 106, 108 and 110 sandwiched between the end housing sections 22 and 32, also provides for conveniently assembling the clutch-brake unit 20 and for disassembly of the unit in the event that it is desired to replace any of the clutch or brake discs and plates.

As another feature, the silent chain drive 134 is self-lubricating by the oil confined within the housing 20 and also within the chain drive housing 142, and the chain drive eliminates the use of gears and the close tolerances required for the gears. In addition, the tension within the silent chain drive 132 may be precisely and infinitely selected by angular adjustment or rotation of the eccentric mounting plate 146. As mentioned above, both of the input shafts 24 and 42 may also be driven by a double-ended single electric motor which is supported by the housing 20 of the clutch-brake unit 15 to provide for a two speed output shaft. The positive oil recirculation between the plates and discs by the hub portions 62, 72 and 76, as indicated by the arrows in FIG. 2, also contributes to providing the drive system with a long and dependable service life.

While the forms of drive systems herein described constitute preferred embodiments of the invention, it is to be understood that the invention is not limited to these precise forms of drive systems, and that changes may be made therein without departing from the scope and spirit of the invention as defined in the appended claims.

The invention having thus been described, the following is claimed:

1. A drive system adapted for use in providing a high speed reversible or multiple speed drive for a machine, said system comprising an oil shear clutch-brake unit including a housing containing a supply of oil, a first input shaft and an output shaft supported by said housing for rotation on an axis, an annular second input shaft supported by said housing for rotation on the axis of said first input shaft and said output shaft, a first annular clutch within said housing and including means for selectively connecting said first input shaft to said output shaft, a second annular clutch within said housing and including means for selectively connecting said second input shaft to said outut shaft, an annular brake within said housing and including means for selectively braking said output shaft relative to said housing, annular actuating means within said housing for axial movement between first and second clutch engaging positions and a brake engaging position, means for driving said first and second input shafts, and means for moving said annular actuating means selectively between said clutch engaging positions and said brake engaging position.

2. A drive system for use in providing a high speed reversible or multiple speed drive for a machine, said system comprising an oil shear clutch-brake unit including a housing containing a supply of oil, a first input shaft and an output shaft supported by said housing for rotation on an axis, an annular second input shaft supported by said housing for rotation on the axis of said first input shaft and said output shaft, means including a first series of interfitting annular clutch plates and discs within said housing for selectively coupling said first input shaft to said output shaft, means including a second series of interfitting annular clutch plates and discs within said housing for selectively coupling said second input shaft to said output shaft, means including a series of interfitting annular brake plates and discs within said housing for selectively braking said output shaft relative to said housing, means including first and second annular actuating pistons supported within said housing for axial movement between a first clutch engaging position for clamping said first series of clutch plates and discs together, a second clutch engaging position for clamping said second series of clutch plates and discs together and a brake engaging position for clamping said brake plates and discs together, means for driving said first and second input shafts, and means for moving said actuating pistons axially between said clutch engaging positions and said brake engaging position.

3. A drive system adapted for use in providing a high speed reversible drive for a machine, said system comprising an oil shear clutch-brake unit including a housing containing a supply of oil, a first input shaft and an output shaft supported by said housing for rotation on an axis, an annular second input shaft surrounding said output shaft, means including a first series of interfitting annular clutch plates and discs surrounding said output shaft for selectively coupling said first input shaft to said output shaft, means including a second series of interfitting annular clutch plates and discs surrounding said output shaft for selectively coupling said second input shaft to said output shaft, means including a series of interfitting annular brake plates and discs surrounding said output shaft between said first and second series of clutch plates and discs for braking said output shaft relative to said housing, means including a first non-rotating annular actuating piston surrounding said output shaft and supported for axial movement between a clutch engaging position for clamping said first series of clutch plates and discs together and a brake engaging position for clamping said brake plates and discs together, means including a second non-rotating annular actuating piston surrounding said output shaft and supported for axial movement between a clutch engaging position for clamping said second series of clutch plates and discs together and a brake engaging position for clamping said brake plates and discs together, all of said annular plates and discs and said annular pistons being disposed between said first and second input shafts, motor means for driving said first and second input shafts, and means for directing controlled fluid pressure to said actuating pistons for selectively moving each said piston between its corresponding said clutch engaging position and said brake engaging position.

4. A drive system as defined in claim 2 wherein said series of brake plates and discs are disposed between opposing portions of said first and second actuating pistons.

5. A drive system as defined in claim 2 wherein both of said actuating pistons surround said output shaft and are supported for non-rotating axial movement.

6. A drive system as defined in claim 2 wherein both of said pistons, said first and second series of clutch plates and discs, and said series of brake plates and discs all surround said output shaft.

7. A drive system as defined in claim 2 wherein said output shaft includes oil propelling means for circulating oil radially outwardly within both of said series of clutch plates and discs and within said series of brake plates and discs.

8. A drive system as defined in claim 2 wherein said output shaft includes integrally formed oil impeller means disposed within both of said series of clutch plates and discs and within said series of brake plates and discs.

9. A drive system as defined in claim 2, wherein said first and second pistons are disposed on opposite sides of said series of brake plates and discs and are effective to brake said output shaft only when both of said first and second pistons are in said brake engaging positions.

10. A drive system as defined in claim 2 wherein series of brake plates and discs and both of said first and second actuating pistons are disposed between said first and second series of clutch plates and discs.

11. A drive system as defined in claim 2 wherein said series of brake plates and discs are disposed between said first and second series of clutch plates and discs, and said first and second actuating pistons are disposed between said first and second input shafts.

12. A drive system as defined in claim 2 wherein said housing includes first and second fluid cylinder sections for receiving said pistons, and said means for moving said pistons comprise a set of fluid passages extending to said cylinder sections.

13. A drive system as defined in claim 12 and including a fluid valve control system connected to said passages and including means operative to avoid both of said actuating pistons from being simultaneously in said clutch engaging positions.

14. A drive system as defined in claim 1 wherein said means for driving said first and second input shafts comprise an electric motor disposed laterally adjacent said housing of said clutch-brake unit and having a motor shaft extending parallel to said input and output shafts, and means including an endless drive element connecting said motor shaft to said second input shaft.

15. A drive system as defined in claim 14 and including a housing mounted on said housing of said clutch-brake unit and enclosing said endless drive element.

16. A drive system as defined in claim 14 and including an annular adjustment ring mounted on said motor for rotation, and eccentric surface means on said adjustment ring to provide for precisely selecting the tension within said endless drive element.

17. A drive system as defined in claim 14 and including a second electric motor having a motor shaft aligned axially with said output shaft, and means connecting said second motor shaft to said first input shaft and adapted to provide for reversing said output shaft.

* * * * *